United States Patent
Ronen et al.

(10) Patent No.: US 12,344,093 B2
(45) Date of Patent: Jul. 1, 2025

(54) VEHICLE HEAD-UP DISPLAY (HUD)

(71) Applicant: Lumus Ltd., Ness Ziona (IL)

(72) Inventors: Eitan Ronen, Rechovot (IL); Ari Grobman, Ness Ziona (IL); Jonathan Gelberg, Modiin (IL); Aviv Frommer, Yokneam Moshava (IL); Eli Glikman, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 191 days.

(21) Appl. No.: 18/012,948

(22) PCT Filed: Jun. 27, 2021

(86) PCT No.: PCT/IL2021/050784
§ 371 (c)(1),
(2) Date: Dec. 26, 2022

(87) PCT Pub. No.: WO2021/260708
PCT Pub. Date: Dec. 30, 2021

(65) Prior Publication Data
US 2023/0139649 A1    May 4, 2023

Related U.S. Application Data

(60) Provisional application No. 63/197,405, filed on Jun. 6, 2021, provisional application No. 63/045,070, filed on Jun. 27, 2020.

(51) Int. Cl.
*B60K 35/00*    (2024.01)
*B60K 35/23*    (2024.01)
(Continued)

(52) U.S. Cl.
CPC .............. *B60K 35/00* (2013.01); *B60K 35/50* (2024.01); *G02B 27/0101* (2013.01);
(Continued)

(58) Field of Classification Search
CPC ...................................................... B60K 35/00
See application file for complete search history.

(56) References Cited

U.S. PATENT DOCUMENTS 6,829,095 B2   12/2004 Amitai
10,739,512 B2   8/2020 Eisenfeld et al.
(Continued)

FOREIGN PATENT DOCUMENTS

CN    109407316 A    3/2019
CN    110967874 A    4/2020
(Continued)

*Primary Examiner* — Jean Paul Cass
(74) *Attorney, Agent, or Firm* — Rivka Friedman

(57) ABSTRACT

A vehicular head-up display (HUD) for displaying an image to a user of a vehicle having a windshield (15) includes an image projector (14) outputting a collimated image and an optical aperture expander. The optical aperture expander includes a light-guide optical element (LOE) (10) having two major external surfaces (30a, 30b). The image projector (14) injects the collimated image so as to propagate within the LOE by internal reflection at the major external surfaces. The LOE also has a set of parallel partially-reflecting internal surfaces (12) which progressively couple out the image illumination from the LOE. The optical aperture expander is deployed such that the image illumination coupled-out of the LOE (12) follows a light path including a reflection from a surface associated with the windshield (15) of the vehicle so as to be visible to the user while the user looks at a scene beyond the windshield.

15 Claims, 9 Drawing Sheets

(51) Int. Cl.
  *B60K 35/50* (2024.01)
  *G02B 27/01* (2006.01)
  *G02B 27/28* (2006.01)
(52) U.S. Cl.
  CPC ............ *G02B 27/283* (2013.01); *B60K 35/23* (2024.01); *B60K 2360/334* (2024.01); *B60K 2360/336* (2024.01); *G02B 2027/011* (2013.01); *G02B 2027/014* (2013.01)

(56) References Cited

U.S. PATENT DOCUMENTS

| | | | |
|---|---|---|---|
| 10,809,528 | B2 | 10/2020 | Amitai |
| 10,914,950 | B2 | 2/2021 | Waldern et al. |
| 11,140,334 | B1 * | 10/2021 | Lu .......................... H04N 23/56 |
| 11,586,040 | B2 * | 2/2023 | Hirata .................... B60K 35/29 |
| 11,747,568 | B2 * | 9/2023 | Waldern ............. G02B 27/0172 |
| | | | 385/129 |
| 11,754,842 | B2 * | 9/2023 | Popovich ............. G02B 6/0035 |
| | | | 345/8 |
| 11,762,143 | B2 * | 9/2023 | Pietilae ................ G02B 6/0036 |
| | | | 385/37 |
| 11,774,758 | B2 * | 10/2023 | Yang .................... G02B 6/0016 |
| | | | 359/34 |
| 11,815,781 | B2 * | 11/2023 | Brown ...................... G02F 1/29 |
| 11,835,722 | B2 * | 12/2023 | Sulai .................... G02B 5/1819 |
| 11,940,625 | B2 * | 3/2024 | Danziger ............... B60K 35/231 |
| 11,951,833 | B1 * | 4/2024 | Wu .......................... G06V 20/46 |
| 11,961,429 | B2 * | 4/2024 | Kusafuka ............... B60K 35/53 |
| 11,988,829 | B2 * | 5/2024 | Lee .......................... G02B 5/32 |
| 12,010,719 | B2 * | 6/2024 | Murakoshi ............. G06V 20/17 |
| 12,017,534 | B2 * | 6/2024 | Lottes .................. H04N 13/395 |
| 12,019,241 | B2 * | 6/2024 | Sarayeddine ...... G02B 27/0101 |
| 2015/0375673 | A1 * | 12/2015 | Testai ..................... B60Q 1/268 |
| | | | 362/545 |
| 2016/0124223 | A1 | 5/2016 | Shinbo et al. |
| 2018/0350236 | A1 * | 12/2018 | Yamaguchi ............ G02B 27/01 |
| 2019/0004314 | A1 * | 1/2019 | Hayashi ................ B60K 35/234 |
| 2019/0212557 | A1 * | 7/2019 | Waldern ................ G02B 6/005 |
| 2021/0033829 | A1 * | 2/2021 | Ishigame ............... G02B 17/08 |
| 2021/0127204 | A1 * | 4/2021 | Porta ..................... G06N 20/20 |
| 2021/0142055 | A1 * | 5/2021 | Broggi ............ G08B 13/19656 |
| 2022/0396148 | A1 * | 12/2022 | Rodrigues ............. B60K 35/00 |

FOREIGN PATENT DOCUMENTS

| | | |
|---|---|---|
| DE | 102019205138 A1 * | 10/2019 |
| DE | 102020205437 B3 * | 7/2021 |
| JP | 2020071415 A | 5/2020 |

\* cited by examiner

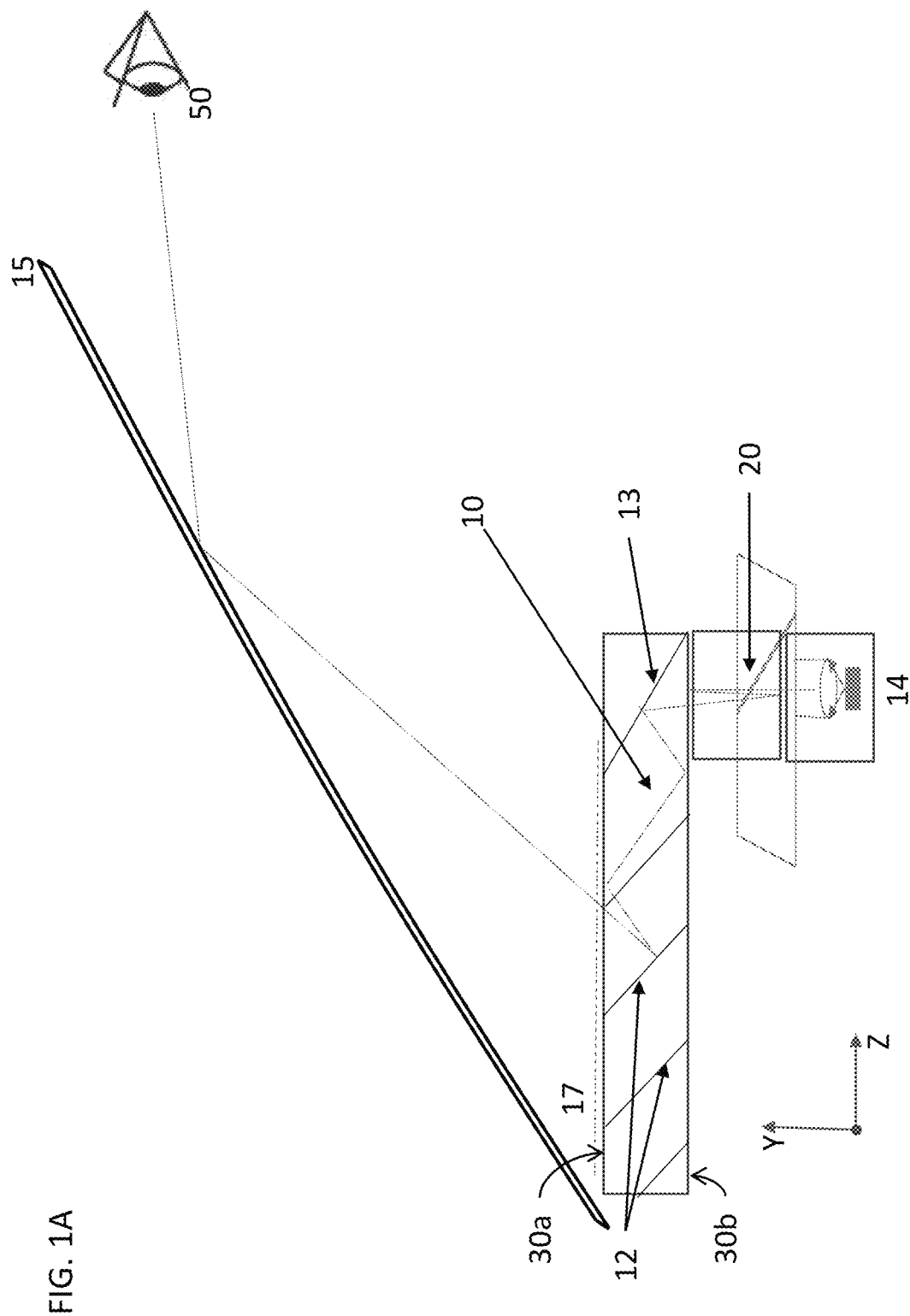

VEHICLE HEAD-UP DISPLAY (HUD)

FIELD AND BACKGROUND OF THE INVENTION

The present invention relates to displays and, in particular, it concerns head-up displays for vehicles, such as automobiles.

There have been numerous proposals and designs to install a HUD in front of a car driver in order to assist by providing various visual functionalities, including but not limited to: driving navigation, availability of dashboard information without shifting gaze from the road, or to project a thermal image into the driver's eyes during low visibility conditions.

Current solutions based on projecting an image onto the windshield have relatively restricted eye motion boxes (EMB) and fields of view (FOV), or require relatively large projection optics to support a wider EMB and FOV.

SUMMARY OF THE INVENTION

The present invention is vehicular head-up display (HUD) for displaying an image to a user of a vehicle.

By way of introduction, Lightguide Optical Elements (LOE) are waveguides used for aperture expanding. The principles of operation of LOEs and are presented in U.S. Pat. No. 6,829,095B2 entitled "Substrate-guided optical beam expander." LOE-based HUDs allow realization of a very compact, self-contained HUD that can be readily installed into confined spaces. They enable the use of very small collimating optics without the need to compromise on field of view (FOV) or eye-motion box (EMB, corresponding to the region from which the image can be viewed). LOE-based aperture expansion arrangements therefore simplify the construction and manufacturing of the optical systems related to the HUD and are thus suitable for a compact, inexpensive, consumer version of a HUD suitable for the automotive industry.

According to the teachings of an embodiment of the present invention there is provided, a vehicular head-up display (HUD) for displaying an image to a user of a vehicle having a windshield, the HUD comprising: (a) an image projector comprising an image generator and collimating optics, the image projector outputting image illumination corresponding to a collimated image; and (b) an optical aperture expander comprising at least a first light-guide optical element (LOE), the LOE having a pair of mutually-parallel major external surfaces, the image projector being optically coupled to the optical aperture expander such that the image illumination propagates within the LOE by internal reflection at the major external surfaces, the LOE further comprising at least one set of mutually-parallel partially-reflecting surfaces internal to the LOE and oblique to the major external surfaces, the set of partially-reflecting surfaces progressively coupling out the image illumination from the LOE, wherein the optical aperture expander is deployed such that the image illumination coupled-out of the LOE follows a light path including a reflection from a surface associated with the windshield of the vehicle so as to be visible to the user while the user looks at a scene beyond the windshield.

According to a further feature of an embodiment of the present invention, the optical aperture expander further comprises a second set of mutually-parallel partially-reflecting surfaces deployed non-parallel to the first set of partially-reflecting surfaces, the second set of partially-reflecting surfaces being deployed to progressively redirect image illumination from the image projector towards the first set of partially-reflecting surfaces.

According to a further feature of an embodiment of the present invention, the second set of partially-reflecting surfaces are located within the LOE between the pair of major external surfaces.

According to a further feature of an embodiment of the present invention, the second set of partially-reflecting surfaces are located within a second LOE bounded by a second pair of major external surfaces.

According to a further feature of an embodiment of the present invention, the second LOE is deployed adjacent to one of the major external surfaces of the first LOE that is further from the windshield of the vehicle.

According to a further feature of an embodiment of the present invention, the set of partially-reflecting surfaces are deployed to couple-out the image illumination from one of the pair of major external surfaces facing away from the windshield, the HUD further comprising a reflective optical element having optical power, the reflective optical element being configured to at least partially compensate for an optical aberration introduced to the image by reflection from the surface associated with the windshield.

According to a further feature of an embodiment of the present invention, the reflective optical element is further configured to define an apparent distance of the image as viewed by the user after reflection from the surface associated with the windshield.

According to a further feature of an embodiment of the present invention, light reflected from the reflective optical element is transmitted through the LOE prior to reflection from the surface associated with the windshield.

According to a further feature of an embodiment of the present invention, the image illumination coupled-out of the LOE follows a light path including a first reflection from a surface associated with the windshield of the vehicle at a high angle of incidence, an intermediate reflection from an additional reflective surface, and a second reflection from the surface associated with the windshield, so as to be visible to the user while the user looks at a scene beyond the windshield.

According to a further feature of an embodiment of the present invention, the surface associated with the windshield is an angularly-selective reflector configured to have a first reflectivity for light incident normal to the surface and a second reflectivity, less than the first reflectivity, for light at an angle of incidence greater than 45 degrees.

According to a further feature of an embodiment of the present invention, the additional reflective surface is a polarized beam splitter, and wherein a quarter-wave plate is interposed in the light path between the surface associated with the windshield and the additional reflective surface.

According to a further feature of an embodiment of the present invention, the surface associated with the windshield and the quarter-wave plate are both integrated into the windshield.

According to a further feature of an embodiment of the present invention, there is also provided a second quarter-wave plate integrated with the windshield and located on the far side of the surface from the user.

According to a further feature of an embodiment of the present invention, the polarized beam splitter is shaped to provide optical power to at least partially compensate for an optical aberration introduced to the image by reflection from the surface associated with the windshield.

There is also provided according to the teachings of an embodiment of the present invention, a system comprising a first HUD and a second HUD, each of the first and second HUDs being implemented as described above, wherein each of the first and second HUDs provides a different region of a field of view visible to the user and/or renders the field of view visible from different regions of an eye-motion box.

According to a further feature of an embodiment of the present invention, the first and second HUDs are deployed in side-by-side relation.

According to a further feature of an embodiment of the present invention, the first and second HUDs are deployed in at least partially overlapping relation.

There is also provided according to the teachings of an embodiment of the present invention, a vehicle door with a window-integrated display, the vehicle door comprising: (a) a door panel; (b) a window supported by the door panel, the window including a visible portion that provides a view of scene beyond the window and a hidden portion extending inside the door panel, the window comprising a light-guide optical element (LOE), the LOE having a pair of mutually-parallel major external surfaces, and at least a first set of mutually-parallel partially-reflecting surfaces internal to the LOE and oblique to the major external surfaces; and (c) an image projector comprising an image generator and collimating optics, the image projector being located within the door panel and optically coupled to a region of the LOE within the hidden portion of the window so as to introduce into the LOE image illumination corresponding to a collimated image, the image illumination propagating within the LOE by internal reflection at the major external surfaces and being progressively coupled-out of the LOE from the visible portion of the window by the set of partially-reflecting surfaces.

According to a further feature of an embodiment of the present invention, optical coupling of the image projector to the LOE is via an air gap, the vehicle door further comprising a mechanism for lowering and raising the window, the image projector being deployed so as to come into alignment for coupling-in the image illumination into the LOE via the air gap when the window is in a raised position.

According to a further feature of an embodiment of the present invention, the LOE is encapsulated within a window material, at least a layer of the encapsulation adjacent to the LOE being formed from a material having a refractive index lower than a material of the LOE so as to support internal reflection at the major external surfaces of the LOE.

BRIEF DESCRIPTION OF THE DRAWINGS

The invention is herein described, by way of example only, with reference to the accompanying drawings, wherein:

FIG. 1A is a schematic side view of a vehicular head-up display (HUD) for displaying an image to a user of a vehicle;

DESCRIPTION OF THE PREFERRED EMBODIMENTS

Figure 1B:
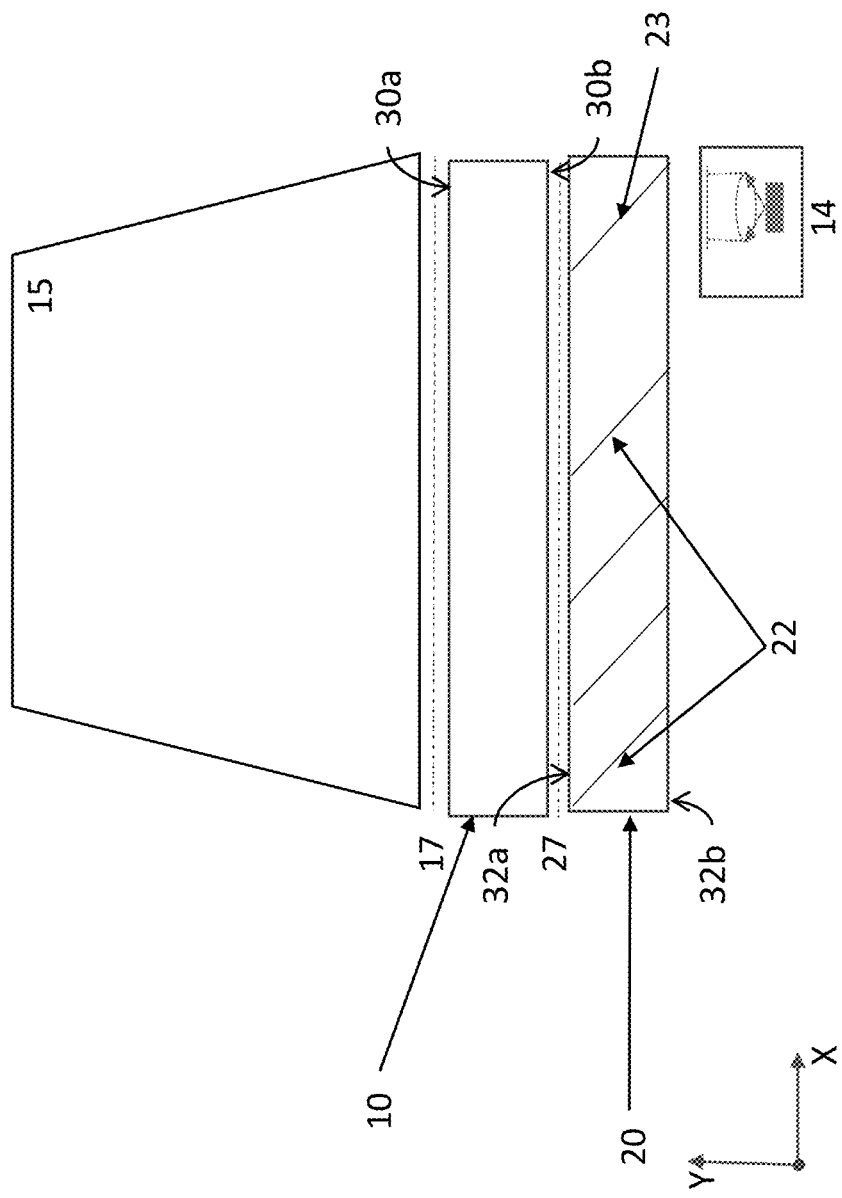
FIG. 1B is a schematic front view of the HUD of FIG. 1A.

The present invention is vehicular head-up display (HUD) for displaying an image to a user of a vehicle.

The principles and operation of head-up displays according to the present invention may be better understood with reference to the drawings and the accompanying description.

Referring now to the drawings, FIGS. 1A-5C illustrate various non-limiting embodiments of a first aspect of the present invention. This aspect of the present invention provides a vehicular HUD for displaying an image to a user of a vehicle (not shown in full) having a windshield 15. The user is represented in the drawings by the image of the user's eye 50, which is located at a region referred to as the "eye-motion box" (EMB) corresponding to the range of positions for which the display is designed. The "user" is typically the driver or operator of the vehicle, but in some cases, may be a passenger in the vehicle other than the driver.

In general terms, the HUD according to this aspect of the present invention includes an image projector or "POD" 14, which includes an image generator and collimating optics so as to output image illumination corresponding to a collimated image. In order to facilitate use of an image projector which has a relatively small output optical aperture, the HUD further includes an optical aperture expander which includes at least a first light-guide optical element (LOE) 10. The LOE 10 has a pair of mutually-parallel major external surfaces 30a, 30b. Image projector 14 is optically coupled to the optical aperture expander so that the image illumination propagates within LOE 10 by internal reflection at major external surfaces 30a, 30b. LOE 10 also includes at least one set of mutually-parallel partially-reflecting surfaces (or "facets") 12, internal to the LOE and oblique to the major external surfaces 30a, 30b. The set of partially-reflecting surfaces 12 progressively couples out the image illumination from LOE 10.

According to this aspect of the present invention, deployment of the optical aperture expander is such that the image illumination coupled-out of the LOE follows a light path including a reflection from a surface associated with windshield 15 of the vehicle so as to be visible to the user 50 while the user looks at a scene beyond the windshield.

It will be immediately apparent that the present invention provides a highly advantageous HUD configuration. Specifically, the use of one or more LOE to expand the optical aperture of the POD enables the use of a compact and lightweight POD while the LOE provides expansion of the optical aperture to the required dimensions according to the required field of view and EMB dimensions. The LOE (illustrated not to scale) can be implemented as a thin flat plate with small volume and weight. The use of the windshield as a combiner leaves the user's view of the real world largely undisrupted.

In certain embodiments, the optical aperture expander also includes a second set of mutually-parallel partially-reflecting surfaces 22, deployed non-parallel to the first set of partially-reflecting surfaces 12 so as to progressively redirect image illumination from the image projector 14 towards the first set of partially-reflecting surfaces 12. Partially-reflecting surfaces 22 thereby achieving a first dimension of optical aperture expansion, while the partially-reflecting surfaces 12 achieve a second dimension of optical aperture expansion. In the example illustrated in FIGS. 1A and 1B, second set of partially-reflecting surfaces 22 are located within a second LOE 20 bounded by a second pair of major external surfaces 32a, 32b. In the preferred but non-limiting implementation illustrated here, second LOE 20 is deployed adjacent to major external surface 30b of first LOE 10, i.e., on the side that is further from windshield 15 of the vehicle. In this manner, the two LOE's are effectively stacked one above the other in a particularly compact configuration. Total internal reflection conditions within each LOE can be maintained either by ensuring a small airgap between them or, more conveniently, by interposing an "isolation layer" of material with a relatively lower refractive index than the material of the LOE itself. The material of the isolation layer may be a low-index optical adhesive, or any other transparent low-index material with suitable mechanical properties. (This is true throughout the various embodiments discussed below, wherever two LOEs are shown with surfaced adjacent to each other.)

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Optionally, some or all of the above components may be arranged on surfaces of one or more polarizing beam-splitter (PBS) cube or other prism arrangement, as is well known in the art.

Optical coupling of image projector 14 to the LOE that is first in the light path (here, LOE 20) may be achieved by any suitable optical coupling, such as for example via a coupling prism with an obliquely angled input surface, or via a reflective coupling arrangement, via a side edge and/or one of the major external surfaces of the LOE. Details of the coupling-in configuration are generally not critical to the invention, and are chosen according to the preferred form-factor for a particular implementation. In the present exemplary embodiment, as best seen in FIG. 1B, coupling-in of the image illumination from image projector 14 into LOE 20 is achieved by an internal reflector 23 which deflects the image illumination so as to propagate along LOE 20 by internal reflection from surfaces 32a, 32b until it reaches partially-reflecting surfaces 22 which progressively couple-out the image illumination towards LOE 10. This achieves a first dimension of aperture expansion relative to the optical aperture of the image projector. Then, as best seen in FIG. 1A, coupling in of the light from LOE 20 into LOE 10 is here achieved by an internal reflector 13 which deflects the image illumination so as to propagate along LOE 10 by internal reflection from surfaces 30a, 30b until it reaches partially-reflecting surfaces 12 which progressively couple-out the image illumination towards windscreen 15 for reflection towards the eye of the user 50 located within the eye motion box. This form of coupling-in facilitates the aforementioned compact stacked configuration of the HUD. Other options for coupling-in are also applicable, typically employing a coupling-in prism. Such options are discussed in detail in co-assigned PCT Patent Application Publication No. WO 2015/162611 A1, and will not be detailed here for brevity of presentation.

A number of additional embodiments will be presented below to illustrate additional aspects of the present invention. For simplicity of presentation, these embodiments will be illustrated with a single LOE 10. It should be understood however that each embodiment may also be implemented with a two-LOE arrangement similar to that of FIGS. 1A and 1B, as will be clear to a person ordinarily skilled in the art.

In certain implementations, it is advantageous for the light reflected from the windshield to be P polarized (in the YZ plane), and the light guided inside the LOE is typically advantageously S polarized. To switch the polarization, an HWP (half waveplate) 17 is advantageously introduced as shown. Additionally, where two orthogonal LOE's are employed for two orthogonal expansions of the optical aperture, as illustrated here, an HWP 27 is advantageously introduced between the LOE's to rotate the polarization and cause the S polarization exiting LOE 20 to be converted to S polarization according to the orientation of the surfaces of LOE 10.

Although illustrated here with partially-reflecting surfaces 22 in a separate LOE from partially-reflecting surfaces 12, alternative implementations may employ two non-parallel sets of partially-reflecting surfaces implemented within a single LOE, i.e., between major external surfaces 30a, 30b. In this case, one set of partially-reflecting surfaces 22 are deployed to deflect the image illumination progressively within the LOE so as to propagate by internal reflection towards partially-reflecting surfaces 12. Such LOE structures are discussed at length in co-assigned PCT Patent Application Publication No. WO 2020/049542 A1.

In each example described here, the internal reflection of the image illumination propagating along the LOE's may be, for example, Total Internal Reflection (TIR) or Fresnel reflections. Additionally, unlike see-through near-eye displays, the optical aperture expander presented here does not require use of a transparent LOE. Thus, the rear (lower) surface of the waveguide (30b) can be opaque, allowing the use of a mirror reflection coating. This provides added design flexibility for the HUD, since the mirror coated surface does not need to obey TIR conditions, thus allowing the waveguide to be mounted on or within a vehicle dashboard with no air barrier between the waveguide and the dashboard.

In some embodiments, the relatively large distance between the eye of the observer and the LOE will increase the viewer's sensitivity to local non-uniformity of display luminance. In some cases, such effects are mitigated by providing a partially reflective coating applied to the upper surface 30a of the LOE 10 and a mirror coating to the lower surface 30b which has the effect of causing mixing of different parts of the aperture and enhanced uniformity of the output.

Figure 2:
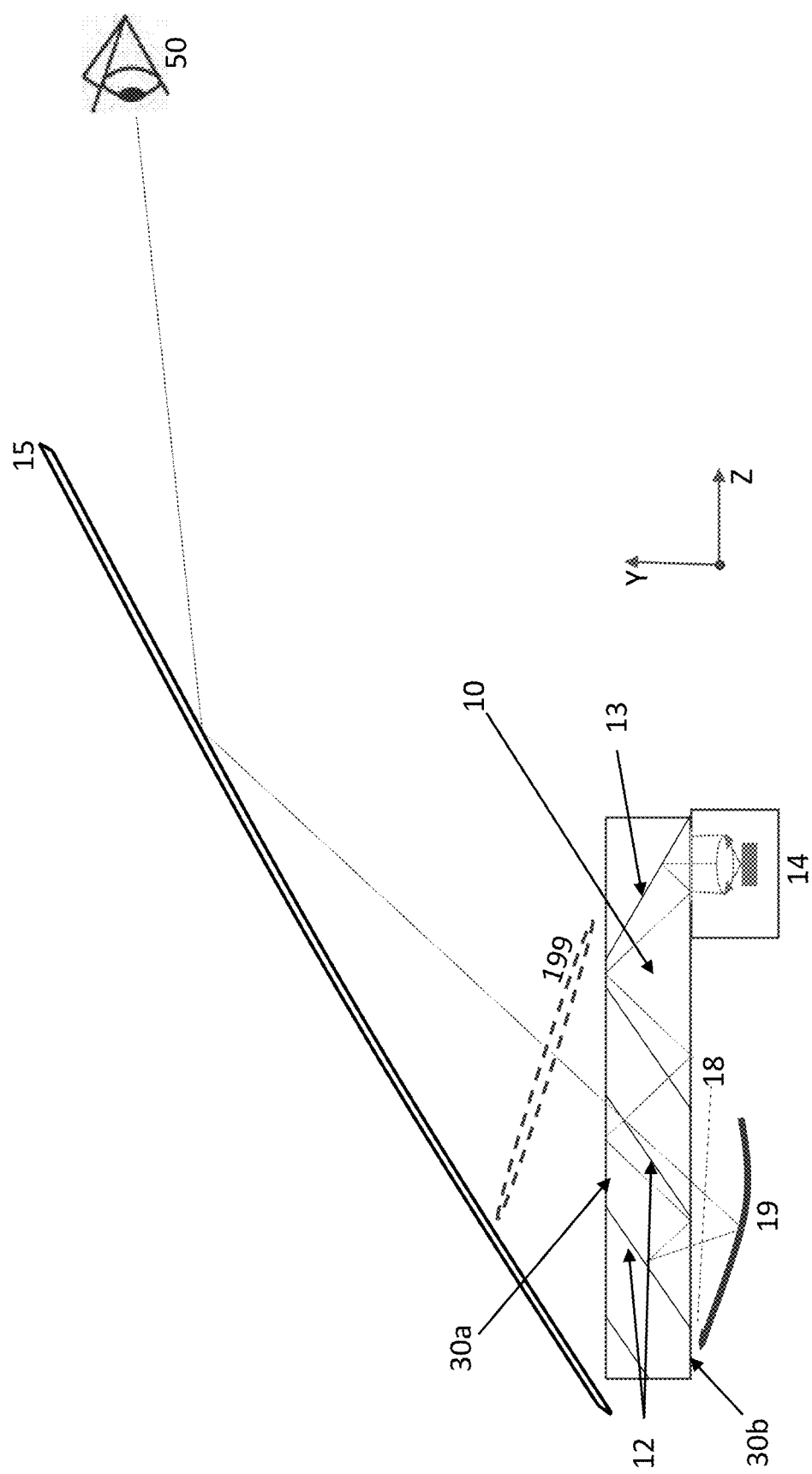
FIG. 2 is a schematic side view of a variant implementation of the HUD of FIG. 1A.
Figure 3:
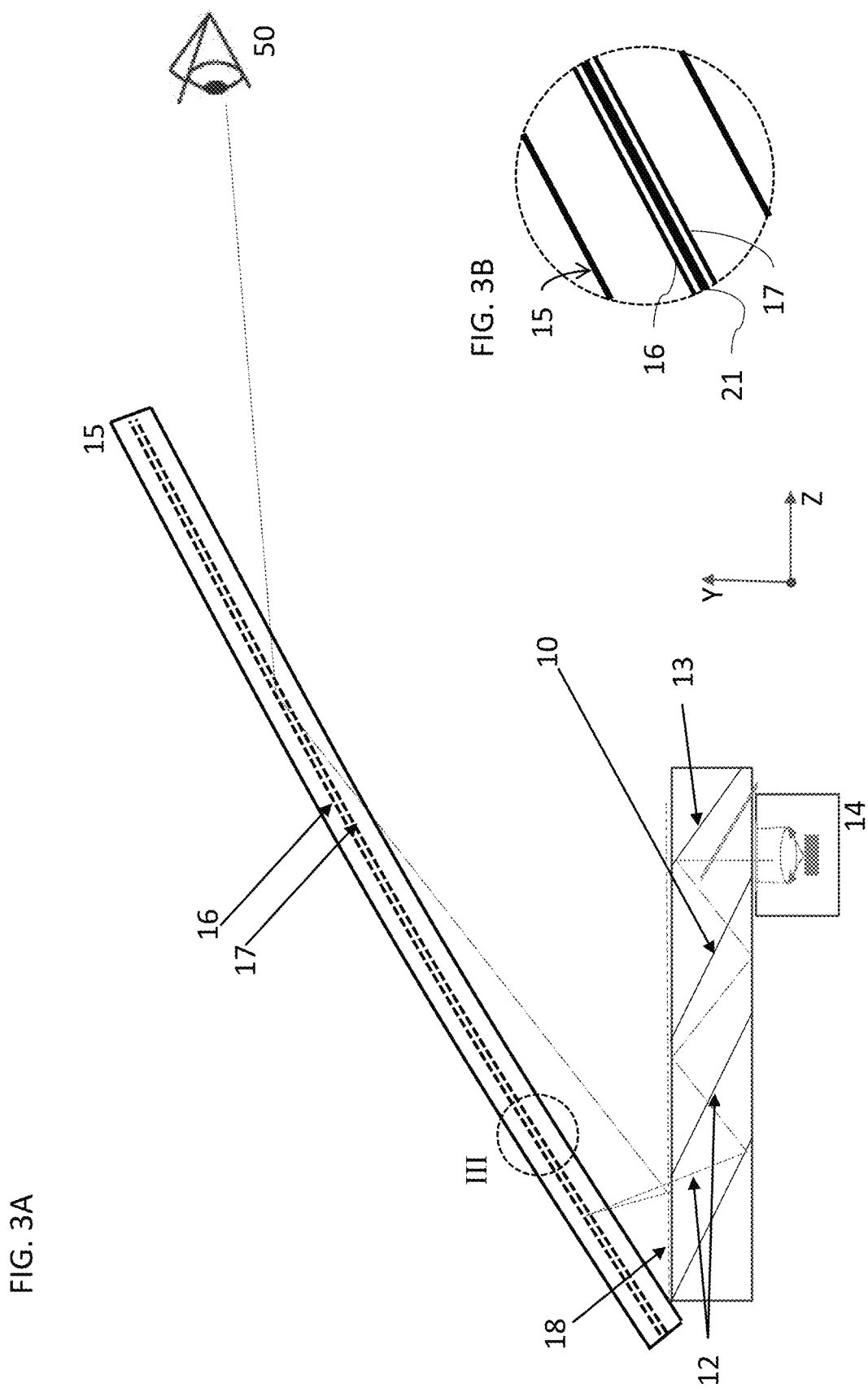
FIG. 3A is a schematic side view of a further variant implementation of the HUD of FIG. 1A.
FIG. 3B is an enlarged view of the region marked III in FIG. 3A.

Turning now particularly to FIG. 2, it is a particular feature of the HUD of the present invention that the image illumination output by projector 14 and propagating through the optical aperture expander is a collimated image. If this light is delivered optically unchanged to the eye of the user, it provides the effect of an image located at infinity. In some cases, it is desirable to introduce an additional optical element (or a plurality of optical elements), such as a (refractive or diffractive) lens, into the optical path, between the waveguide and the windshield which introduce additional optical power, in order to provide one or more of the following functionalities:

1. Shifting of the focal plane as observed by the occupant from infinity to an intermediate focal plane. Thus, some dashboard elements may be made to appear closer than others, or all elements at some preferred apparent distance.
2. Compensation of astigmatism, defocus, barrel, pincushion or any other image distortion resulting from non-planarity of windshield. (Certain types of distortion may alternatively be corrected by synthetic adjustment of the digital image to compensate for windshield or other induced image distortions.)
3. Lateral (X and/or Y) shifting of the positioning of the eye box and/or the field of view. (Such shifting may also be enabled by means of mechanical shifting and/or reorienting of the optical engine.)

One such implementation is illustrated schematically in FIG. 2 by introduction of an optical element 199 (shown by dashed lines) between LOE 10 and windshield 15. However, adding such an element may impact the compactness of the implementation. An alternative implementation which may be particularly advantageous is illustrated in FIG. 2 (disregarding the dashed element 199), according to which light is coupled out of LOE 10 downwards and then reflected upwards from a reflective optical element 19 towards the windshield. Optical element 19 provides functionality similar to that described above for element 199. In some cases, element 19 may be integrated with a polarization rotation element, specifically a quarter-wave plate (QWP) 18, and the coatings providing the reflective properties of surface 12 may be implemented as polarization-dependent coatings. Thus, if S polarization is coupled-out by facets 12, a double-pass of the illumination through QWP 18 before and after reflection at surface 19 converts the S polarization to P polarization, which then passes through facets 12 with minimal disruption. As shown in FIG. 2, the orientation of facets 12 in LOE 10 is here inverted, so that the set of partially-reflecting surfaces 12 couple-out the image illumination from major external surface 30b (facing away from the windshield), where it is reflected from reflective optical element 19 which modifies the image illumination according to its optical power. Element 19 may at least partially compensate for an optical aberration introduced to the image by reflection from the surface associated with the windshield. Additionally, or alternatively, element 19 may be configured to define an apparent distance of the image as viewed by the user after reflection from the surface associated with the windshield.

In the preferred implementation illustrated here, light reflected from reflective optical element 19 is transmitted through the LOE prior to reflection from the surface associated with the windshield. In alternative implementations, by varying the orientation of the LOE and element 19, it is possible to have the return optical path from element 19 towards windshield 15 circumvent the LOE.

Turning now to FIGS. 3A and 3B, in certain implementations, it may be useful to employ a light path which includes two reflections from a surface associate with the windshield. In the example illustrated here, the image illumination coupled-out of LOE 10 follows a light path including a first reflection from a reflector surface associated with the windshield of the vehicle at a first angle of incidence, an intermediate reflection from an additional reflective surface 18, and a second reflection from the surface associated with the windshield, so as to be visible to the eye 50 of the user while the user looks at a scene beyond the windshield. This double-reflection architecture may be particularly advantageous in terms of unobtrusive placement of the HUD system close to the lower extremity of the windshield. Although the features are not shown combined, this option is advantageously combined with the two-dimensional optical aperture expansion of FIGS. 1A and 1B, and/or with the use of a reflective optical element 19 as in FIG. 2.

This approach can be enhanced by employing an angularly selective reflector surface 21 associated with the windshield having a first reflectivity for light incident normal to the surface and a second reflectivity, less than the first reflectivity, for light at an angle of incidence greater than 45 degrees. This ensures that the first reflection is a relatively high proportion reflection, thereby making it easier to ensure that sufficient display intensity remains after the second windshield reflection to provide an easily visible display. Such angularly-selective reflective properties can be implemented using multilayer dielectric coatings, as is known in the art.

Certain particularly optimized implementations of this approach, various components are used to manage polarization and/or ensure sufficient image brightness. By way of one non-limiting specific example, additional reflective surface 18 is advantageously implemented as a polarized beam splitter, and a quarter-wave plate 17 is interposed in the light path between the reflective surface associated with the windshield 15 and the additional reflective surface 18. A second quarter-wave plate 16 is advantageously included in the windshield located on the far (outer) side of the surface from the user. Most preferably, first and second QWPs 16 and 17, and partial reflector surface 21 are all integrated integrated into windshield 15, for example, as illustrated in the enlarged partial view of FIG. 3B Operation of this configuration is then as follows. Surface 18 preferably combines an HWP (half wave plate) with a polarized beam splitter (polarization dependent mirror) reflecting only S polarized light. The HWP converts the S polarization coupled out from the LOE into P polarization, which then passes through reflector 18. Inside the windshield, light reflected from partially reflecting layer 21 passes twice through QWP 17, acting as a half-wave plate and converting the P polarization back to S polarization, which is then reflected by surface 18. The light reflected from surface 18 is incident on the windshield at a larger angle of incidence (i.e., shallower angle) as S polarization, which is again transformed to P polarization by passing twice through QWP 17, before and after reflection at partial reflector 21, before being delivered to the observer's eye 50.

Additionally, the presence of QWP 16 ensures that light that passes through partial reflector 21 at the second reflection is also converted to P polarized and, being incident on the outer surface of the windshield at an angle close to the Brewster angle, would not be significantly reflected, thereby avoiding formation of ghost images. For high efficiency of such a system, the dependency of reflectivity of surface 21 as a function of angle is pronounced, with high reflection at low angles of incidence (AOI) for the first reflection and lower reflection at higher AOI, for the second reflection.

Optionally, the polarized beam splitter of surface 18 may be shaped to provide optical power to at least partially compensate for an optical aberration introduced to the image by reflection from the surface associated with the windshield and/or to provide a desired apparent range of the display, in a manner similar to element 19 described above.

Figure 4:
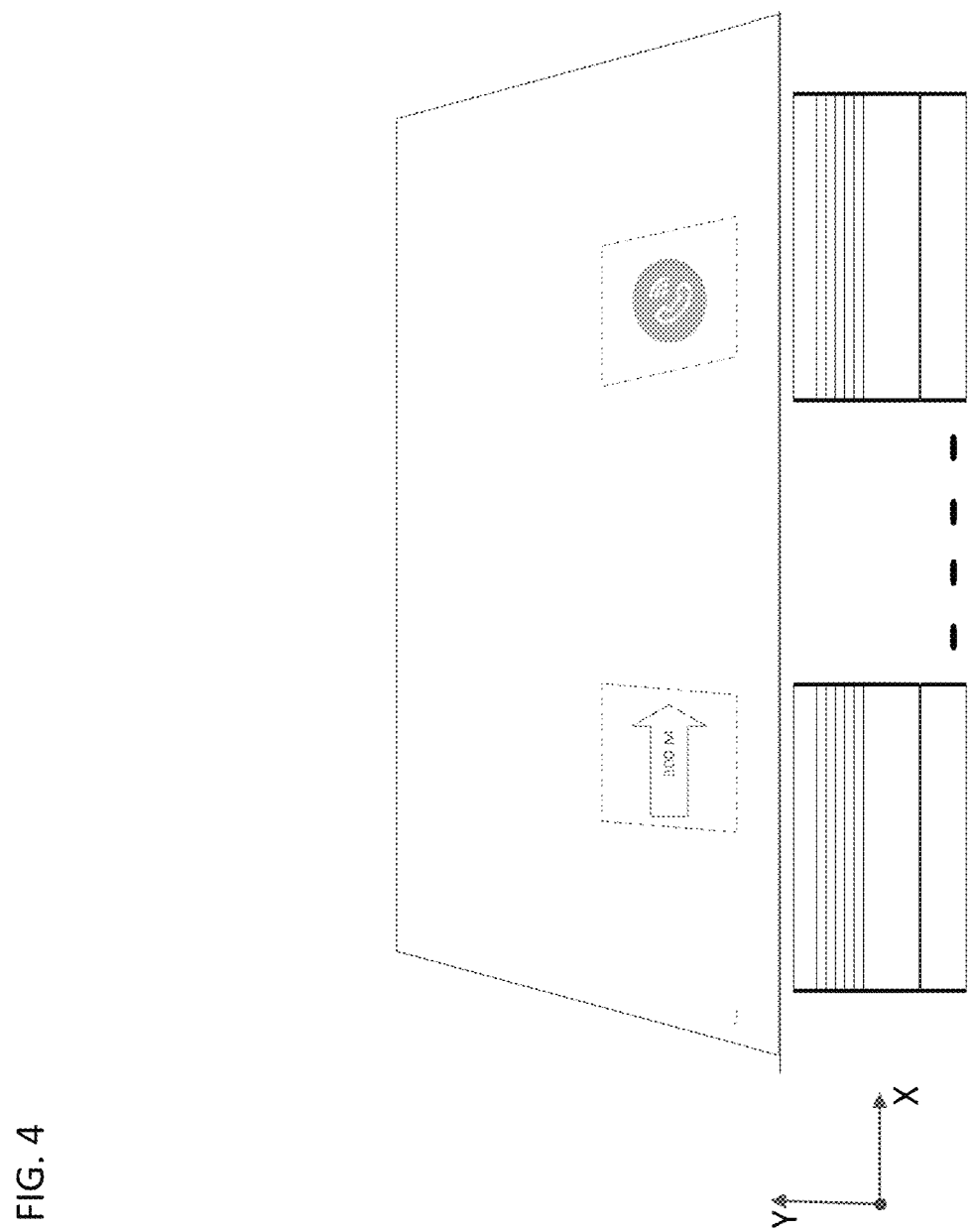
FIG. 4 is a schematic front view of a system employing a plurality of HUD units according to FIG. 1A.

Turning now to FIGS. 4 and 5A-5C, in certain cases, it may be advantageous to combine two or more HUDs into a combination system, where each HUD provides a different region of a field of view visible to the user and/or renders the field of view visible from different regions of an eye-motion box. These multiple HUDs may be deployed in side-by-side relation, e.g., arrayed along the X direction as illustrated in FIG. 4. Alternatively, in certain cases, multiple HUDs are deployed in at least partially overlapping relation, as will be illustrated with reference to FIGS. 5A-5C.

Thus, in some cases, two or more optical engines, each comprising an LOE and a POD, are placed beneath the windscreen of an automobile in order to reflect multiple images, each with its own eye motion box and segment of the field of view of the driver or passenger. The height, scale and perceived focal plane of each of these images may be independently controlled as will be elaborated below. FIG. 4 illustrates schematically a plurality of optical engines (OEs) projecting independent sections of an image without image stitching. By "image stitching", it is meant that the two or more projected and/or coupled out images contain partially overlapping image data.

In some embodiments (also for a single HUD), the HUD system can include a controller configured to control one or more elements of the HUD. For example, the controller may be used to control the additional optical element described above implemented as an electrically-controllable optical element to achieve one of the purposes described above. The controller may control various HUD system elements independently of one another or in coordination and cooperation with one another. For example, the controller may be used to adjust the focal depth of the images separately and independently of one another. The controller preferably also includes all necessary electronic components, such as at least one processor or processing circuitry, to drive the image projector, all as is known in the art.

According to a further option, such adjustment/compensation may be performed independently for each of the plurality of optical engines in any of three axes. In an optimal embodiment, such adjustment can be performed by the use of electronically tunable lenses, PZT actuators or any other type of electrically-variable optical element.

Certain preferred implementations of the present invention may provide one or more of the following advantages:
1. An expanded and adjustable eye motion box and field of view.
2. A static or dynamically adjustable focal plane for different image elements.
3. A compact form factor for integration into vehicle dashboard.
4. Compact optical parts enable cost effectiveness and high optical performance.

Figure 5A:
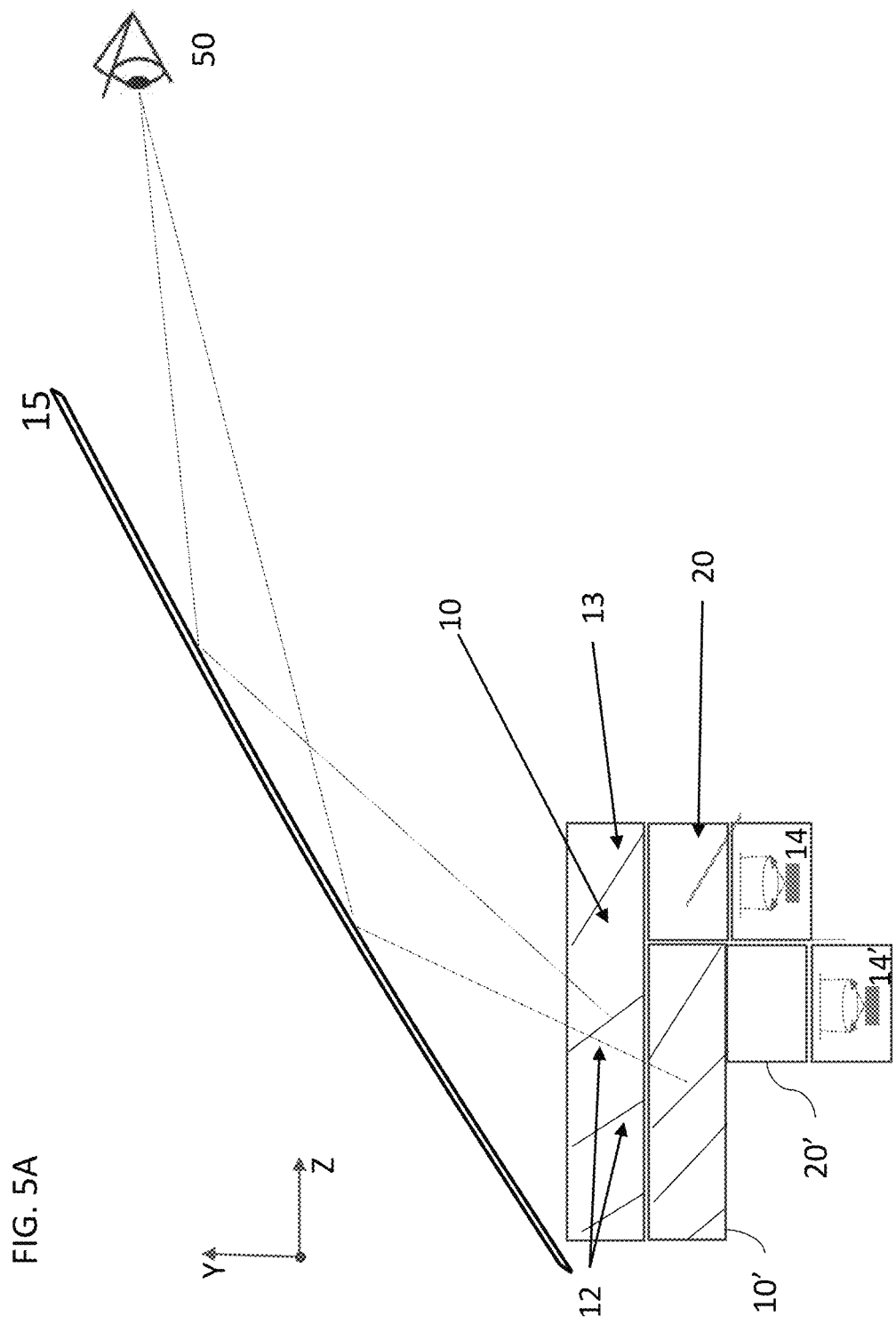
FIG. 5A is a schematic side view of a system employing a plurality of HUD units similar to FIG. 1A in stacked relation to provide an extended field of view.
Figure 5B:
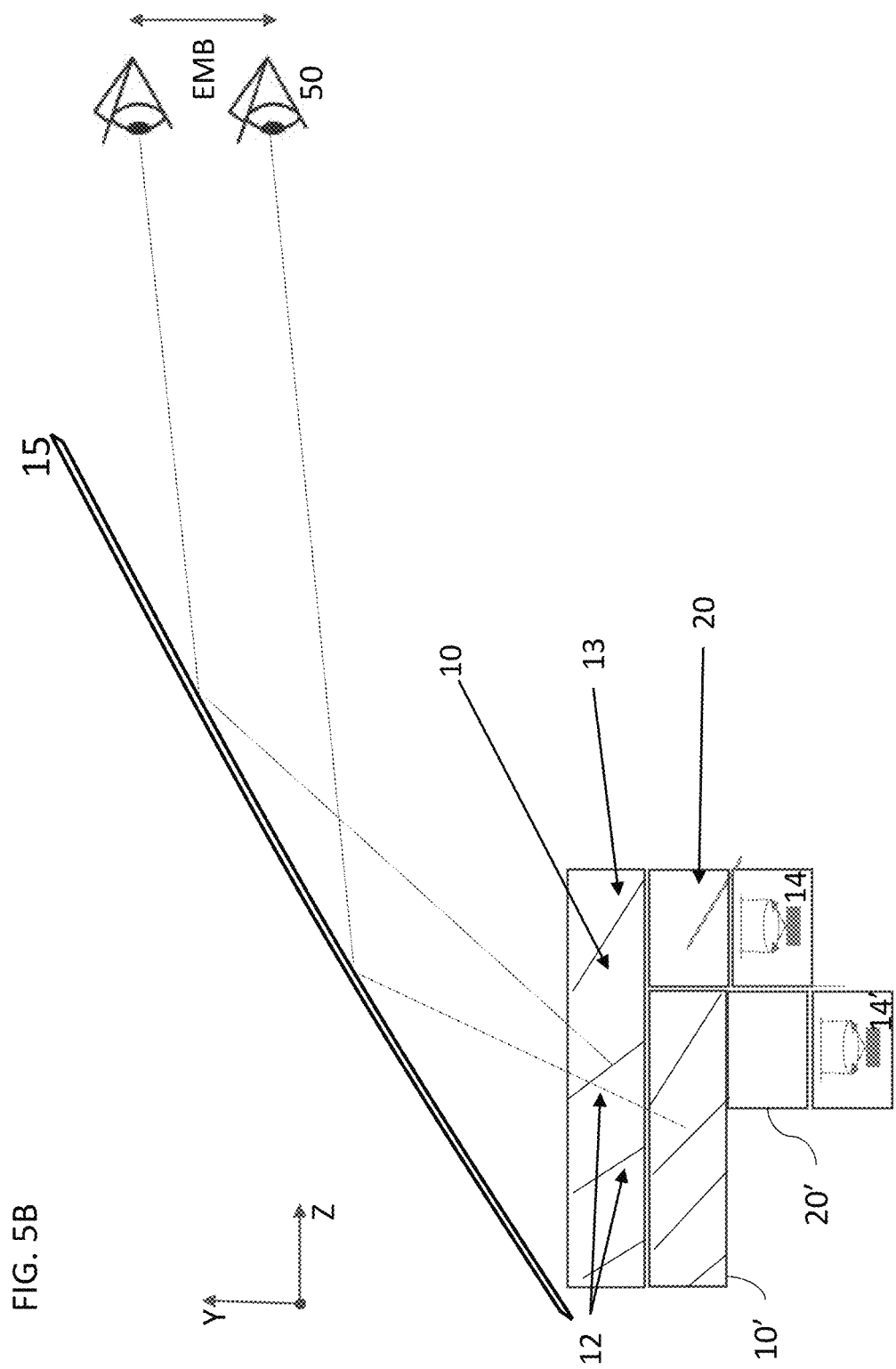
FIG. 5B is a schematic side view of a system employing a plurality of HUD units similar to FIG. 1A in stacked relation to provide an extended eye-motion box.
Figure 5C:
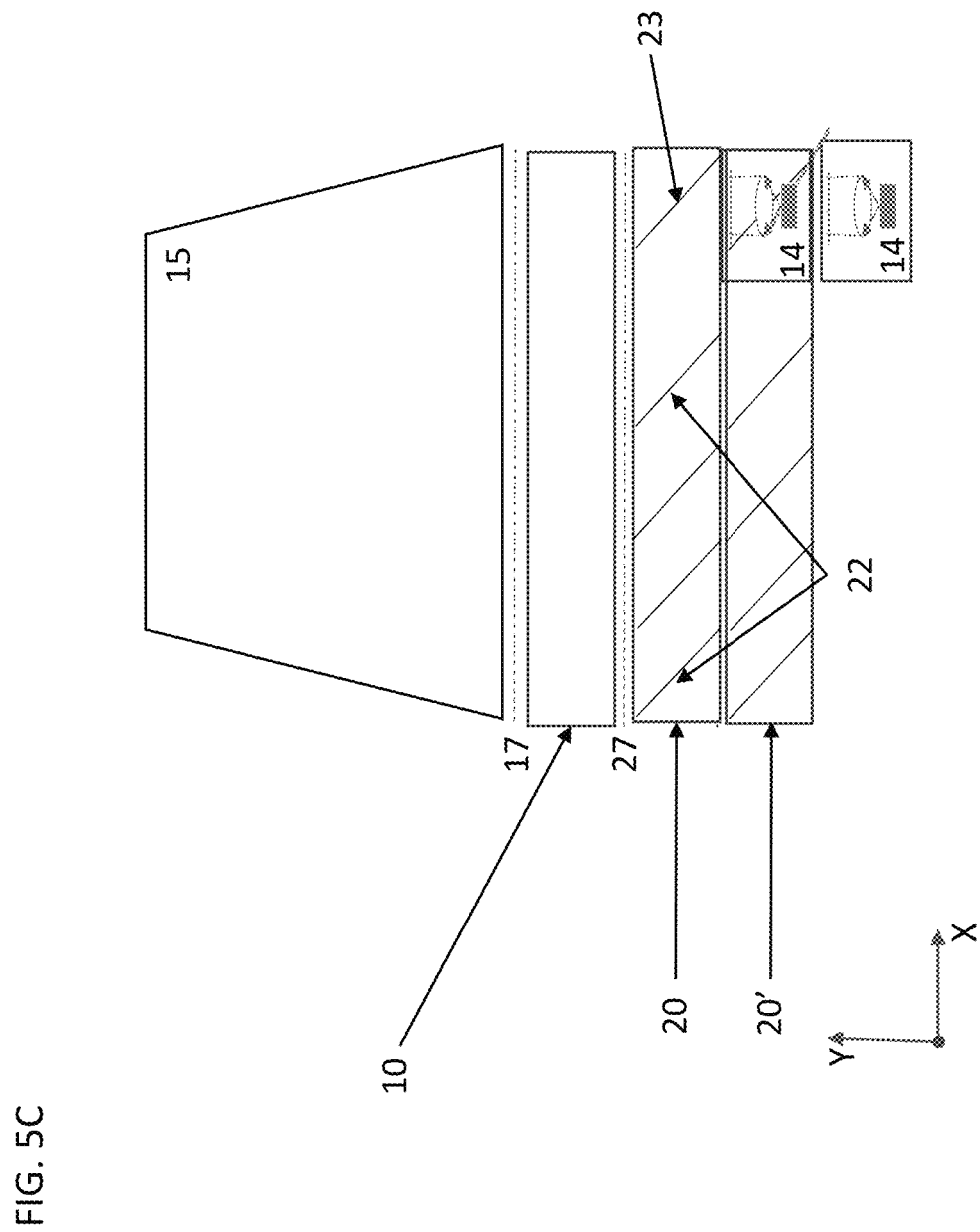
FIG. 5C is a schematic front view of the system of FIGS. 5A and 5B.

FIGS. 5A-5C illustrate a further implementation in which two optical aperture expanders are staggered in at least partially overlapping relation. A first HUD configuration includes image projector 14, LOE 20 and LOE 10 in a manner identical to the corresponding elements of FIGS. 1A and 1B. A second HUD configuration employs similar components, labeled 14', 20' and 10', respectively. These elements can be neatly nested, as illustrated in the drawings, with suitable optical isolation layers between adjacent LOEs to maintain TIR conditions. Various polarization schemes may be used to minimize interaction between the two HUDS in the region of overlap. By way of one non-limiting example, LOE 10' may operate with partially reflecting surfaces that are implemented using structural polarizer beam splitters (e.g., wire grid beam splitters) that partially reflect P polarization, which is then transmitted by the partially-reflecting surfaces of LOE 10. In all other respects, the structure and operation of LOE 10' will be understood by analogy to LOE 10.

FIG. 5A illustrates a case in which different regions of a vertical field of view (FOV) are projected by the two HUD subsystems. Depending on the image content, these images may be subregions of a continuous image which are "stitched" together so as to provide a single continuous enlarged field of view, greater than would be provided by a single HUD system of the given dimensions. FIG. 5B illustrates an alternative application, in which the same FOV is provided by both systems, but they supplement each other to provide the required FOV over a larger eye-motion box region, represented by the vertical arrow EMB in FIG. 5B.

In the various embodiments disclosed herein, the desired parallelism of the optical surfaces and other optical properties of the HUD components may be impacted by extreme temperature gradients. In order to avoid extreme temperature gradients, it may be preferable in some cases to implement thermal control of at least part of the HUD system. This may be implemented by mounting various of the HUD components (POD and/or LOEs) on thermal plates, which tend to maintain a uniform temperature across the components. Most preferably, thermoelectric temperature control components are associated with the thermal plates to keep the optical components within a target temperature range.

In certain implementations, it may be preferably to provide a UV blocking layer integrated into windshield 15 in order to protect the optical components of the HUD from UV degradation. Additionally, or alternatively, the uppermost surface of the HUD optics, such as HWP 17, PBS 18 or upper LOE surface 30a may be provided with a UV blocking layer.

Additional precautions may be needed in certain cases to preclude external radiation, and particularly direct sunlight, from reflecting off the surfaces of the HUD optical components, such as the LOEs, at angles that might cause "ghost" reflections which could reach the eye of the user. Such precautions may include the use of a polarizing strip across the lower edge of the windshield so as to only admit the polarization that is not being conveyed to the user's eye (according to one of the polarization schemes described above). This can be further enhanced by providing antireflective coating on any exposed surfaces of the LOEs to minimize surface reflections of sunlight glare. Additionally, or alternatively, in some cases, it may be possible to block certain directions of potential incoming glare by carefully positioned mechanical baffles which shade the optical elements from incoming solar glare at the relevant angles which carry a risk of ghost reflections.

In some embodiments, the HUD system can include an eye tracking sensor configured to detect the position of the driver's pupil. A controller coupled to the eye tracking sensor can be used to control the optical element positioned between the waveguide and the windshield based on the position or viewing direction of the eyeball. For example, if the driver is looking far ahead, the optical element can be adjusted to increase the focal depth of one or more images.

Similarly, if the driver's eye(s) is focused at a point relatively close, the optical element can be adjusted to decrease the focal depth of one or more images. Similarly, the controller can adjust the lateral position of one or images based on the driver's viewing direction as detected by the eyeball tracking sensor.

Figure 6B:
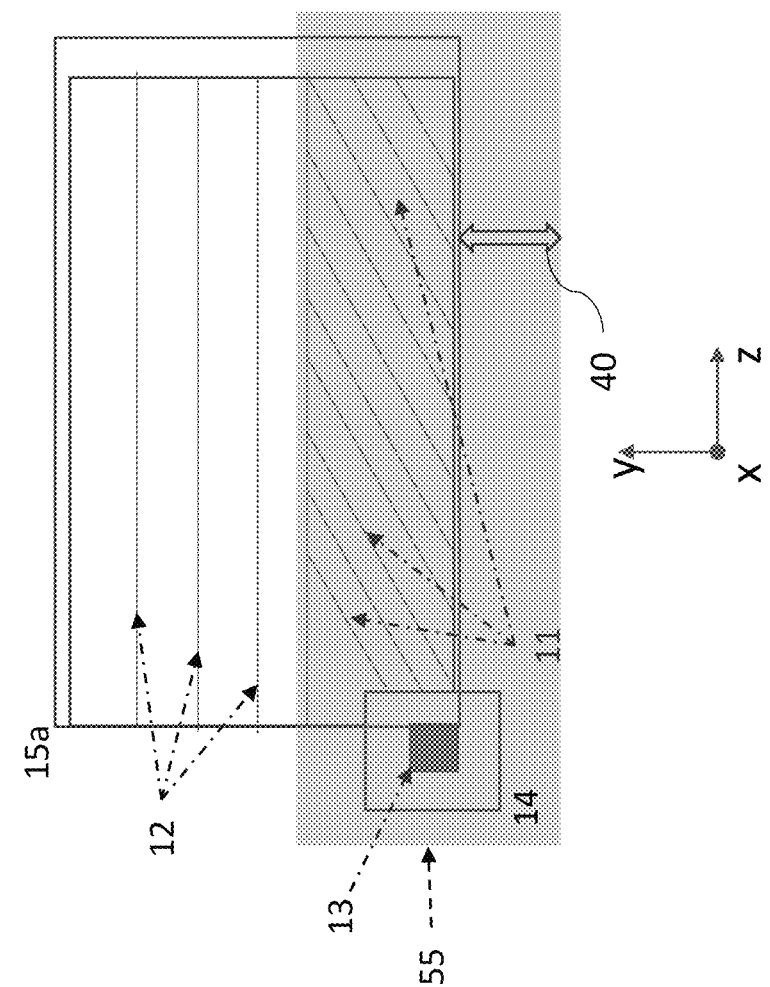
FIGS. 6A and 6B are schematic side and front views, respectively, of a HUD according to a further aspect of the present invention suitable for implementation in upright windows, particularly associated with a door panel.
Figure 6A:
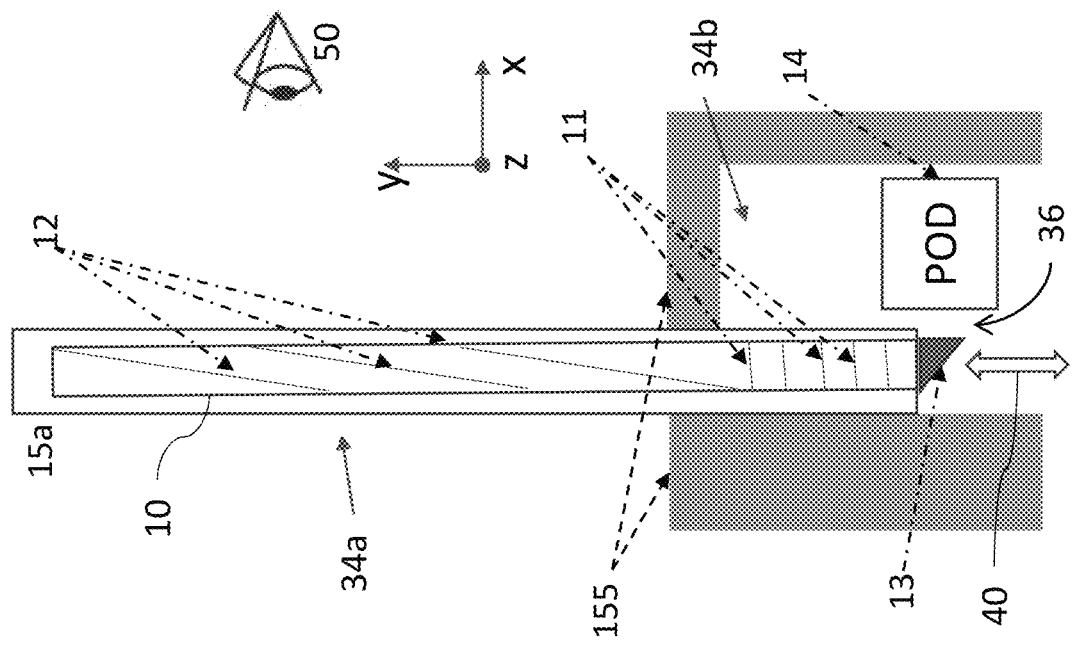

A further aspect of the present invention is illustrated schematically in FIGS. 6A and 6B. In this case, the waveguide (LOE) is introduced inside or adjacent to the side windows of the car, typically aligned almost vertically. One preferred technology for this configuration is a compound LOE structure (such as described in "LOE with Two-Axis Internal Aperture Expansion"). Thus, the image can be expanded vertically as well as horizontally, providing two-dimensional expansion of the image further reducing the size and complexity of the imaging pod.

As shown in FIG. 6A, the observer's eye 50, representing the EMB, is shown in-front of the window 15a to which an LOE 10 is adjacent or integrated. The LOE ("waveguide") includes a set of mutually-parallel partially-reflecting internal surfaces 12, expanding the optical aperture ("pupil") in one dimension, in this case along the Y direction, and another set of mutually-parallel partially-reflecting internal surfaces 11, expanding the optical aperture in the orthogonal direction, here along the Z direction. In the non-limiting example illustrated here, the light is injected from a POD 14 into the LOE via a coupling prism 13. This structure could be implemented inside a side window 15 with different methods of encapsulation, optionally by use of an air gap, or low-index adhesive, or another low-index isolation layer which facilitates supporting propagation by internal reflection. The LOE is thus preferably encapsulated within a window material, with at least a layer of the encapsulation adjacent to the LOE being formed from a material having a refractive index lower than a material of the LOE so as to support internal reflection at the major external surfaces of the LOE. Alternatively, angularly-selective reflective coatings may be used to emulate TIR properties. In FIG. 6B, the waveguide and POD are shown from another point of view, along the X direction.

According to one aspect of the invention, this HUD window configuration is integrated into a window of a vehicle door 155. In this case, a system according to the teachings of the present invention includes a door panel 155 and a window 15a supported by the door panel. Window 15a includes a visible portion 34a that provides a view of scene beyond the window and a hidden portion 34b that extends inside the door panel 155. An LOE 10, integrated with window 15a has a pair of mutually-parallel major external surfaces 30a, 30b, and at least a first set of mutually-parallel partially-reflecting surfaces 12 internal to the LOE and oblique to the major external surfaces. An image projector 14, including an image generator and collimating optics, is located within the door panel 155 and optically coupled to a region of the LOE 10 within the hidden portion 34b of the window so as to introduce into the LOE image illumination corresponding to a collimated image, the image illumination propagating within the LOE by internal reflection at the major external surfaces and being progressively coupled-out of the LOE from the visible portion of the window by the set of partially-reflecting surfaces. In certain particularly preferred cases, two-dimensional expansion is achieved by incorporating an additional set of mutually-parallel internal partially-reflective surfaces 11, analogous to the configurations described in PCT Patent Application Publication No. WO 2020/049542 A1. It is particularly advantageous that image projector 14 and, if present, facets 11, are located within the door panel 155, offering physical protection to the image projector and associated components, and preventing facets 11 from generating problematic "ghost" reflections of ambient light from the sky and other light sources or bright objects.

It is common for vehicle door windows to include a mechanism for lowering and raising the window relative to the door panel, represented by arrow 40 in FIGS. 6A and 6B, which may add complexity to the HUD implementation. In certain cases, it may be preferred that the image projector does not move together with the window. In this case, optical coupling of the image projector 14 to the LOE 10 may advantageously be achieved via an air gap 36. The implementation illustrated here employs an air gap together with a coupling-in prism 13 which is integrated with the LOE. Image projector 14 is then deployed so as to come into alignment for coupling-in the image illumination into LOE 100 via air gap 36 and prism 13 when the window is in a raised position, but without obstructing lowering of the window.

It will be appreciated that the various HUDs of the present invention may be used to advantage to display a wide range of information relating to operation of the vehicle. For example, in certain particularly preferred implementations, the HUD system displays dashboard elements including two or more selected from the group consisting of: speedometer, turn signal, fuel gauge, and temperature gauge. Additionally, or alternatively, the system may include a controller configured to receive data from a plurality of sensors and to generate a plurality of images corresponding to the data received from the plurality of sensors for projecting by the HUD(s) for viewing by the user.

It will be appreciated that the above descriptions are intended only to serve as examples, and that many other embodiments are possible within the scope of the present invention as defined in the appended claims.

What is claimed is:

1. A vehicular head-up display (HUD) for displaying an image to a user of a vehicle having a windshield, the HUD comprising:
   (a) an image projector comprising an image generator and collimating optics, the image projector outputting image illumination corresponding to a collimated image; and
   (b) an optical aperture expander comprising at least a first light-guide optical element (LOE), the LOE having a pair of mutually-parallel major external surfaces, the image projector being optically coupled to the optical aperture expander such that the image illumination propagates within the LOE by internal reflection at the major external surfaces, the LOE further comprising at least one set of mutually-parallel partially-reflecting surfaces internal to the LOE and oblique to the major external surfaces, the set of partially-reflecting surfaces progressively coupling out the image illumination from the LOE,
   wherein the optical aperture expander is deployed such that the image illumination coupled-out of the LOE follows a light path including exiting the LOE from one of the pair of major external surfaces facing away from the windshield, being reflected from a reflective element having optical power, passing back through the LOE and being reflected from a surface associated with the windshield of the vehicle so as to be visible to the user while the user looks at a scene beyond the windshield, wherein the surface associated with the windshield is non-planar, and wherein the optical power of the reflective element is configured to at least partially compensate for an optical aberration introduced to the image by reflection from the surface associated with the windshield.

2. The HUD of claim 1, wherein the optical aperture expander further comprises a second set of mutually-parallel partially-reflecting surfaces deployed non-parallel to the first set of partially-reflecting surfaces, the second set of partially-reflecting surfaces being deployed to progressively redirect image illumination from the image projector towards the first set of partially-reflecting surfaces.

3. The HUD of claim 2, wherein the second set of partially-reflecting surfaces are located within the LOE between the pair of major external surfaces.

4. The HUD of claim 2, wherein the second set of partially-reflecting surfaces are located within a second LOE bounded by a second pair of major external surfaces.

5. The HUD of claim 4, wherein the second LOE is deployed adjacent to one of the major external surfaces of the first LOE that is further from the windshield of the vehicle.

6. The HUD of claim 1, wherein the reflective optical element is further configured to define an apparent distance of the image as viewed by the user after reflection from the surface associated with the windshield.

7. The HUD of claim 1, wherein the light path includes a first reflection from the surface associated with the windshield of the vehicle at a high angle of incidence, an intermediate reflection from an additional reflective surface, and a second reflection from the surface associated with the windshield, so as to be visible to the user while the user looks at a scene beyond the windshield.

8. The HUD of claim 7, wherein the surface associated with the windshield is an angularly-selective reflector configured to have a first reflectivity for light incident normal to the surface and a second reflectivity, less than the first reflectivity, for light at an angle of incidence greater than 45 degrees.

9. The HUD of claim 7, wherein the additional reflective surface is a polarized beam splitter, and wherein a quarter-wave plate is interposed in the light path between the surface associated with the windshield and the additional reflective surface.

10. The HUD of claim 9, wherein the surface associated with the windshield and the quarter-wave plate are both integrated into the windshield.

11. The HUD of claim 10, further comprising a second quarter-wave plate integrated with the windshield and located on the far side of the surface from the user.

12. The HUD of claim 9, wherein the polarized beam splitter is shaped to provide optical power to at least partially compensate for an optical aberration introduced to the image by reflection from the surface associated with the windshield.

13. A system comprising a first HUD and a second HUD, each of the first and second HUDs being implemented according to claim 1, wherein each of the first and second HUDs provides a different region of a field of view visible to the user and/or renders the field of view visible from different regions of an eye-motion box.

14. The system of claim 13, wherein the first and second HUDs are deployed in side-by-side relation.

15. The system of claim 13, wherein the first and second HUDs are deployed in at least partially overlapping relation.

* * * * *